Dec. 9, 1947.   H. J. SHAFER   2,432,178
WATER SOFTENING APPARATUS HAVING A VALVE FOR
ADMITTING REACTIVATING AGENT THERETO
Filed July 4, 1944

WITNESSES:
R J Ridge
E. H. Lutz

INVENTOR
HOMER J. SHAFER.
BY
ATTORNEY

UNITED STATES PATENT OFFICE 2,432,178

WATER-SOFTENING APPARATUS HAVING A VALVE FOR ADMITTING REACTIVATING AGENT THERETO

Homer J. Shafer, Mansfield, Ohio, assignor to Westinghouse Electric Corporation, East Pittsburgh, Pa., a corporation of Pennsylvania Application July 4, 1944, Serial No. 543,457

9 Claims. (Cl. 210—24)

My invention relates to apparatus for softening water and has for an object to provide improved apparatus of this kind.

A further object of the invention is to effect, in a water softener of the regenerative type, the delivery of salt or other reactivating agent to the body of softening material without manually breaking any pressure-tight connections.

Figure 1:
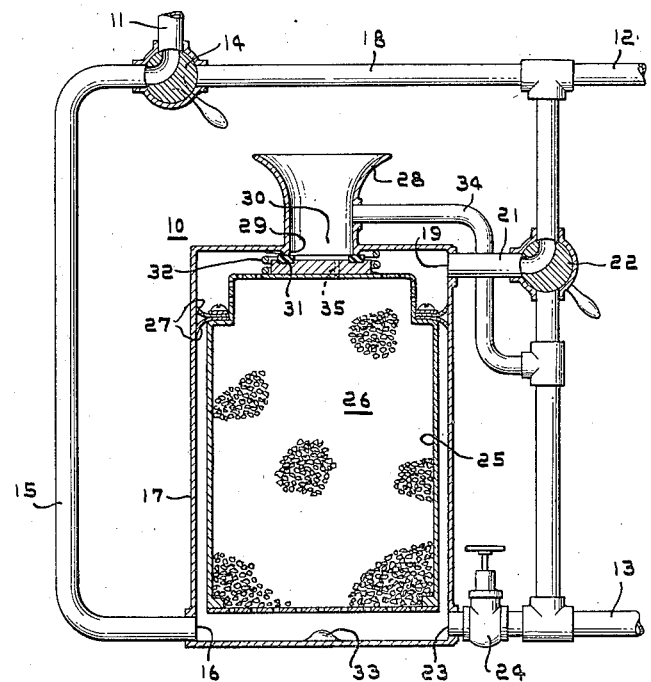
Figure 2:
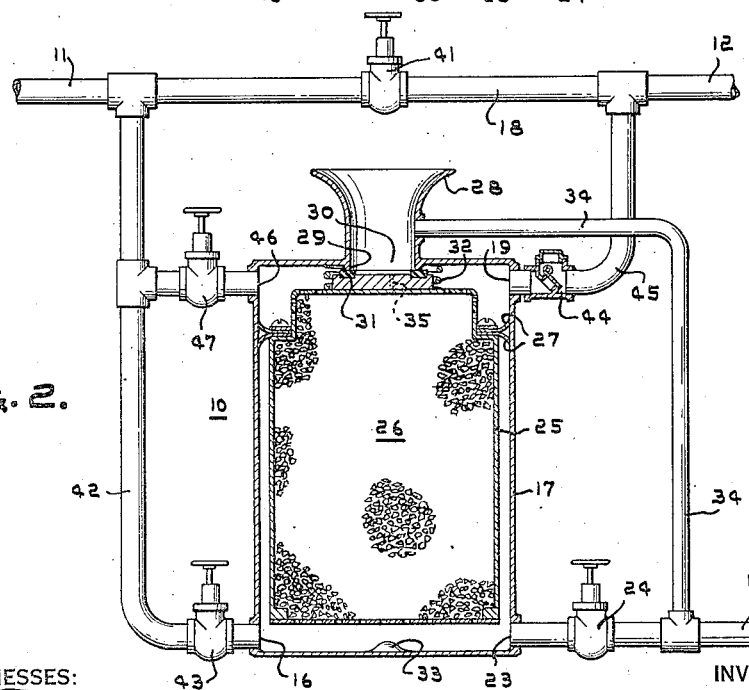

These and other objects are effected by my invention as will be apparent from the following description and claims taken in connection with the accompanying drawing, forming a part of this application, in which:

Fig. 1 is a sectional view showing my improved water softener connected in a water supply system; and Fig. 2 is a view similar to Fig. 1 showing a second embodiment of the invention.

Referring first to Fig. 1 of the drawing, I have shown my improved water softener, generally indicated at 10, applied to a water distribution system including a water supply conduit 11 and a service conduit 12 which extends to the fixtures to be supplied with softened water. A conduit 13 is shown which extends to a drain. Water to be softened passes from the supply conduit 11 through a conventional two-way valve 14 to a conduit 15 which terminates in an inlet opening 16 formed in the casing 17 of the water softener 10. The system also includes a by-pass conduit 18 for passing untreated water directly from the supply conduit 11 to the service conduit 12 when the two-way valve 14 is adjusted clockwise 90 degrees from the position shown in the drawing. As will be apparent from the description which follows, water is by-passed directly from the supply conduit 11 to the service conduit 12 during periods when the water softening material is being regenerated.

The casing 17 of the water softener is provided with an outlet 19 for softened water, which outlet 19 is connected by means of a conduit 21 to a two-way valve 22. In the position of the valve 22 shown in the drawing, the outlet 19 of the water softener 10 is connected with the service conduit 12. An adjustment of the valve 22 counterclockwise 90 degrees from the position shown will connect the outlet 19 of the water softener with the drain conduit 13. The casing 17 is also provided with an outlet 23 communicating with the drain conduit 13 under control of a valve 24 for a purpose to be referred to hereinafter.

In accordance with my invention, the water softening device 10 is provided with a perforate container 25 for a body 26 of Zeolite or other regenerative water softening material. The container 25 occupies a substantial portion of the casing 17 and is movable therein between an upper water softening position, as shown in Fig. 1, and a lower, regenerating position, as described hereinafter. A suitable flexible seal 27, movable with the container 25, closes the space intervening between the container 25 and the casing 17 for preventing the by-passing of water around the container 25 as it flows from the inlet 16 of the container 25 to the outlet 19 thereof.

The casing 17 is provided at its upper end with an opening or passage 30 through which a regenerating agent, such as, for example salt may be deposited in the casing 17. Preferably, a vessel or pot 28 for receiving the salt agent is arranged on the casing 17 and encloses the passage 30. A valve seat 29 is disposed within the casing 17 peripherally of the passage 30. A valve 31 movable upwardly and downwardly with the container 25 cooperates with the valve seat 29 for closing the passage 30 and isolating the salt pot 28 from the casing 17 in the upper or water softening position of the container 25. In the lower or regenerative position of the container 25, the valve 31 is disengaged from the seat 29 so that the passage 30 provides communication between the salt pot 28 and the casing 17. A spring 32 may be employed for biasing the container 25 to its lower position. Downward movement of the container 25 is limited by a stop 33.

*Operation*

As shown in Fig. 1, the apparatus is in its water softening position. Water from the supply conduit 11 passes through the valve 14 and conduit 15 to the casing inlet 16 and then flows upwardly through the perforate container 25 and the body of zeolite 26 whereby the water is softened, as is well understood. The softened water discharged from the container 25 on the downstream side thereof passes through the conduit 21 and the valve 22 to the service pipe 12. It will be noted at this time that the casing 17 is subjected to the full pressure of the water in the supply conduit 11. Accordingly, the container 25 is biased upwardly by the water pressure so that the valve 31 is firmly held in engagement with the seat 29 for isolating the salt pot 28 from the casing.

When the zeolite body is to be reactivated, a quantity of salt is deposited in the pot 28 and the valve 14 is moved ¼ turn clockwise. The valve 22 is also moved ¼ turn counterclockwise. The described movement of the valve 14 provides for the delivery of untreated water from the supply conduit 11 to the service conduit 12 and also relieves the pressure in the casing 17, whereupon the container 25 is moved downwardly by gravity and by the bias of the spring 32. Accordingly, the valve 31 is moved to its open position for delivery of salt from the pot 28 through the passage 30 to the interior of the casing 17. The valve 24 is then opened and the valve 22 is moved to the position shown in the drawing, whereupon water from the by-pass conduit 18 enters the casing 17 through its outlet 19 and washes the salt in solution downwardly through the bed of zeolite 26; the water which occupies the casing 17 passing out through the drain pipe 13. When this operation has been completed, the valve 24 is closed and the valve 22 is again moved ¼ turn counterclockwise from the position shown in the drawing for terminating the flow of water to the casing 17. Since the valve 31 and its seat 29 are arranged opposite the opening 19, the water entering through the opening 19 during the washing down operation just described will wash any granular or undissolved salt from the valve 31 and its seat 29.

After a period of time necessary for the reactivation of the zeolite has elapsed, the valve 14 is turned to the position shown in the drawing, whereupon flushing water is passed from the conduit 11 to the casing 17 through the opening 16. At this time, the brine contained within the casing 17 is flushed to the drain through the conduit 21, the valve 22 and the conduit 13. Upon completion of the flushing operation, the valve 22 is moved to the position shown in the drawing. The water under pressure admitted to the casing 17 during the flushing operation, just described, flows upwardly through the zeolite bed 26 and provides a pressure difference across the container 25 so that the latter is forced upwardly against the bias of the spring 32 to the position shown in Fig. 1. The valve 31 is, therefore, held firmly against its seat 29 by the pressure of the water within the casing 17. The apparatus now is in its water softening position and needs no further attention until regeneration is necessary.

From the foregoing description it will be apparent that the only operations necessary for the generation or reactivation of the zeolite bed 26 are the depositing of the salt in the salt pot 28 and the actuation of the valve 14, 22 and 24. The pressure-tight connection defined by the seat 29 and valve 31 is automatically opened and closed in response to the pressure of the water admitted to the casing 17 or to the upward and downward movement of the container 25 in the casing 17.

Reference will now be had to Fig. 2 where I have shown a second embodiment of the invention; parts which are common to both Figs. 1 and 2 being indicated by similar reference characters. The water supply and service pipes 11 and 12 in Fig. 2 are connected by a by-pass conduit 18 having a valve 41 connected therein. The service conduit 11 communicates with the inlet 16 of the casing 17 by means of a conduit 42 and a valve 43. The outlet port 19 of the casing 17 connects with a one-way check valve 44 which is connected to the service conduit 12 by means of conduit 45.

The construction of the water softening device 10 is the same as disclosed in connection with the first embodiment except that it includes an additional inlet port 46 which is connected to the conduit 42 through a valve 47.

*Operation*

During water softening periods, the valve 43 is open and the valves 41, 47 and 24 are closed. Water from the supply pipe 11 enters the casing 17 through the inlet 16 and, after passing through the zeolite bed 26, is discharged from the casing 17 through an outlet port 19, check valve 44 and the conduit 45 to the service pipe 12.

Regeneration of the softener 10 is effected by closing the valve 43 and opening the valve 24, whereupon the water pressure in the casing 17 is relieved and therefore, the container 25 moves downwardly to disengage the valve 31 from its seat 29. Accordingly, salt which has been deposited in the salt pot 28 is discharged into the casing 17. The valve 47 is opened for washing the salt downwardly through the zeolite bed 26 towards the outlet 23. After this operation is completed, the valves 47 and 24 are closed and the zeolite is subjected to the salt solution for a period of time necessary for its reactivation.

After reactivation is complete, the valves 24 and 47 are again opened for flushing the salt solution from the casing 17 and the zeolite bed 26. After flushing, the valves 24 and 47 are closed and the valve 43 is opened, whereupon there is a momentary flow of water from the inlet port 16 upwardly through the container 25 and out through the salt pot and overflow conduit 34. This flow of water provides a pressure difference across the zeolite container 25 so that the latter is forced upwardly to engage the valve 31 and its seat 29 and, therefore, terminates the flow of water into the salt pot 28. As described, the container 25 is held in its upper, water softening position by the pressure of the water within the casing 17. It will be understood that during regeneration or reactivation, the valve 41 may be open to pass untreated water from the supply conduit 11 to the service conduit 12. The water inlet 46 is arranged opposite the valve 31 and its seat 29 so that water admitted through the opening 46 is directed across the valve 31 and its seat 29 for flushing any granular, undissolved salt therefrom. Reverse flow of water from the service pipe 12 to the casing 17 is prevented at all times by the check valve 44.

From the foregoing description, it will be apparent that I have provided an improved water softener of the regenerative type which may be readily regenerated without manually breaking or opening any pressure-tight connections between the salt vessel and the softening compartment. This operation has been difficult heretofore because the regenerating salt solution or brine corrodes the connection in time and experience shows it is difficult to maintain this connection clean so it may be readily opened and closed. The valve which I have provided for controlling communication between the salt pot and the zeolite compartment is automatically opened and closed in response to the pressure of the water being treated and is maintained clean by the water admitted for the washing down of the regenerating brine.

If desired, a small continuous flow or seepage of water through the salt pot 28 to the overflow conduit 34 may be maintained by providing a restricted orifice in the valve 31 as shown by broken lines 35. This flow of fresh water will keep the salt pot 28 filled to its overflow outlet and will prevent salt from crystallizing in the portion of the salt pot exposed to evaporation during the long periods of operation of the apparatus between the periods of regeneration.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. Water softening apparatus comprising a casing for containing a charge of regenerative water softening material and having an inlet for water to be treated formed in one end thereof and an outlet for softened water formed in the opposite end thereof, said inlet and outlet being so arranged that water conveyed through the casing flows through the softening material, said casing having a passage therein adjacent said outlet through which a reactivating agent for the water softening material is introduced, a valve for opening and closing said passage and means responsive to the pressure of the water admitted to the casing for treatment for controlling said valve, said valve closing the passage when said pressure is above a predetermined value and opening the passage for the introduction of the reactivating agent to the charge of softening material when said pressure is below a predetermined value and means adjacent said inlet for removing reactivating agent from the casing.

2. In water softening apparatus, the combination of a casing having an inlet for water to be treated arranged in a lower portion of the casing and an outlet for softened water disposed in an upper portion of the casing, a bed of regenerative water softening material disposed within the casing intermediate said inlet and outlet, said casing having a passage therein disposed adjacent said outlet and through which a reactivating agent for said water softening material may be introduced, valve means for opening and closing said passage and means responsive to the inlet water pressure controlling said valve, said valve being closed when said pressure of the water is above a predetermined value and open for the introduction of the reactivating agent to the casing when the pressure of the water is below a predetermined value and means for flushing the reactivating agent from the casing.

3. In water softening apparatus of the regenerative type, the combination of a casing having an inlet for water to be treated and an outlet for softened water spaced from the inlet, a perforate container for regenerative water softening material disposed within the casing intermediate said inlet and outlet and movable between a water softening position and a regenerating position, means responsive to the pressure of the water in the casing for actuating the container, said container being actuated by said means to its water-softening position when the pressure of the water in the casing is above a predetermined value and to its regenerating position when said pressure is below a predetermined value, said casing having a passage therein for the delivery of a regenerating salt to the softening material within the casing, a valve actuated by the container and responsive to movement of the container to its water-softening position for closing said passage, said valve being moved to open the passage for the delivery of salt to the casing in response to movement of the container to its regenerating position and means for draining water and salt from the casing.

4. In water softening apparatus, the combination of a casing, a body of regenerative water softening material disposed within the casing, means for conveying water to be treated to the casing and for discharging the softened water from the casing, said casing having a passage therein for the introduction of regenerating salt to the casing, valve means for controlling communication between the passage and the casing and including a valve member and a valve seat, means for engaging and disengaging the valve and seat, means disposed adjacent said valve means for directing water across said valve member and seat when the former is disengaged from the latter so that solid particles of salt are flushed from the valve and seat and means for removing salt and water from the casing.

5. In water-softening apparatus, the combination of a casing having an inlet opening for water to be softened and disposed in one end of the casing and an outlet opening for the softened water disposed in the opposite end of the casing, a bed of regenerative water-softening material for treating the water in the casing and arranged intermediate the inlet and outlet openings, said casing having a passage therein adjacent the outlet opening for the admission of a reactivating agent to the casing, a valve seat within the casing surrounding said passage, a valve associated with said seat, means responsive to a predetermined pressure of the water in the casing for engaging the valve and seat so that the passage is closed, said pressure-responsive means being effective to disengage said valve and seat in response to a pressure less than said predetermined pressure, whereupon said passage is opened for the admission of the reactivating agent and means for flushing said agent from the casing.

6. In water-softening apparatus, the combination of a casing including a top wall structure and defining a chamber for water to be softened, an inlet for admitting water to be softened to a lower region of the chamber, an outlet for discharging softened water from an upper region of the chamber, a bed of regenerative water-softening material within the chamber intermediate said inlet and outlet, a receptacle for salt carried by said top wall structure, a valve controlling communication between said receptacle and the chamber, said valve, when open, providing for the delivery of salt to the chamber and, when closed, isolating the receptacle from the chamber, movable means extending substantially across the chamber and actuated by the pressure of the water admitted through said inlet for opening and closing said valve, said movable means effecting the closing of the valve in response to a predetermined value of the pressure of the water and effecting the opening of the valve when the pressure of the water is below said value, means including a restricted passage for conveying water from one side of the movable means to the opposite side thereof, and vice versa, and means for draining water and salt in solution from the lower region of the chamber.

7. In water-softening apparatus, the combination of a casing having a perforate wall member movable upwardly and downwardly in the casing and defining upper and lower chambers within the casing, a bed of regenerative water-softening material in the lower chamber, means for admitting hard water to the lower chamber, means for discharging soft water from the upper chamber, said casing having a passage formed therein for the delivery of salt to the upper chamber, a valve controlling said passage and actuated by said movable wall member, said wall member moving upwardly in response to a predetermined high value of the pressure of the water in the lower chamber for closing the valve, biasing means for moving the wall member downwardly to open the valve when the pressure of the water is less than said predetermined value, means for draining water and salt from the lower chamber and means for admitting flushing water to the upper chamber.

8. In water-softening apparatus, the combination of a casing, a container structure including a movable wall member disposed interiorly of and extending, substantially, across the casing, said wall member forming within the casing a water-softening chamber and a soft water chamber, means for admitting hard water to the water-softening chamber, means for discharging soft water from the soft water chamber, said casing having a passage for salt communicating with the soft water chamber, a valve for opening and closing said passage and actuated by said movable wall member, said wall member being moved to its valve-closed position in response to a predetermined value of the pressure in the water-softening chamber, means biasing the wall member to its valve-open position when the pressure in the water-softening chamber is depressed below said value, a bed of water-softening material in the container structure and disposed in the water-softening chamber, means defining an orifice providing communication between the water-softening chamber and the soft water chamber and means for draining water and salt in solution from the water-softening chamber.

9. In water-softening apparatus, the combination of a casing, a perforate container for water-softing material disposed within the casing and having a wall thereof extending, substantially, across the casing, means for delivering hard water to the casing below said wall, means for discharging soft water from the portion of the casing above said wall, said casing having formed therein a passage for admitting salt to the portion of the casing above said wall, a valve carried by said wall for opening and closing the passage, said wall and valve being movable within the casing to a position wherein said passage is closed in response to a predetermined value of the pressure of hard water admitted to the casing, said wall and valve gravitating to a position wherein the valve opens the passage when the pressure of the water is depressed below said value, means defining an orifice providing communication between the portions of the casing above and below said wall and means for draining water and salt in solution from the lowermost region of the casing below said wall.

HOMER J. SHAFER.

REFERENCES CITED

The following references are of record in the file of this patent:

UNITED STATES PATENTS

| Number | Name | Date |
| --- | --- | --- |
| 1,620,717 | Brice et al. | Mar. 15, 1927 |
| 2,366,112 | Jokel | Dec. 26, 1944 |
| 1,675,860 | Neumann | July 3, 1928 |
| 1,867,572 | Johnson | July 19, 1932 |
| 1,918,225 | Dotterweich | July 11, 1933 |
| 2,065,962 | Bowers | Dec. 29, 1936 |
| 2,347,201 | Lindsay | Apr. 25, 1944 |
| 788,359 | Kasper | Apr. 25, 1905 |